United States Patent [19]
Brkovic

[11] Patent Number: 5,940,287
[45] Date of Patent: Aug. 17, 1999

[54] CONTROLLER FOR A SYNCHRONOUS RECTIFIER AND POWER CONVERTER EMPLOYING THE SAME

[75] Inventor: Milivoje Slobodan Brkovic, Plano, Tex.

[73] Assignee: Lucent Technologies Inc., Murray Hill, N.J.

[21] Appl. No.: 09/115,487

[22] Filed: Jul. 14, 1998

[51] Int. Cl.$^6$ .............................. H02M 7/217; G05F 1/40
[52] U.S. Cl. ............................................ 363/127; 323/283
[58] Field of Search ........................... 363/127; 323/283, 323/224, 285, 284, 286, 287

[56] References Cited

U.S. PATENT DOCUMENTS

| | | | |
|---|---|---|---|
| 5,072,171 | 12/1991 | Eng | 323/282 |
| 5,138,249 | 8/1992 | Capel | 323/283 |
| 5,534,769 | 7/1996 | Ishii | 323/283 |
| 5,636,116 | 6/1997 | Milavec et al. | 363/89 |

OTHER PUBLICATIONS

U.S. application No. 08/887,502, Case Name: Rozman–19; filed Jul. 2, 1997; entitled "Circuit and Method For Controlling a Synchronous Rectifier Converter" to Milivoje S. Brkovic.

U.S. application No. 08/696,674, Case Name: Boylan–5; filed Aug. 14, 1996; entitled "Circuit and Method for Controlling a Synchronous Rectifier Converter" to Jeffrey J. Boylan, et al.

*Primary Examiner*—Peter S. Wong
*Assistant Examiner*—Rajnikant B. Patel

[57] ABSTRACT

For use in a power converter having a power switch and a synchronous rectifier device coupled between an input and an output thereof, a transient response network, method of disabling a synchronous rectifier device and power converter employing the network and method. In one embodiment, the transient response network includes a synchronous rectifier controller, coupled to the power switch and the synchronous rectifier device, that senses a state of the power switch and disables the synchronous rectifier device when the power switch has remained in a nonconducting state for at least a specified period of time.

26 Claims, 8 Drawing Sheets

CONTROLLER FOR A SYNCHRONOUS RECTIFIER AND POWER CONVERTER EMPLOYING THE SAME

TECHNICAL FIELD OF THE INVENTION

The present invention is directed, in general, to power conversion and, more specifically, to a controller for a synchronous rectifier, method of disabling a synchronous rectifier and a power converter employing the controller and method.

BACKGROUND OF THE INVENTION

A converter is a power processing circuit that may have an input-output isolation transformer and generally operates to convert an input voltage waveform with a DC component into an output DC voltage waveform. The presence of an isolation transformer often requires the use of a rectifier circuit in the converter output circuit to perform the waveform conversion. The traditional rectifier uses rectifying diodes that conduct the load current only when forward biased in response to the input waveform. In some rectifiers (i.e., synchronous rectifiers), the diodes are replaced by controllable switches that are periodically biased into conduction and nonconduction modes in synchronism with the periodic waveform to be rectified. In self-synchronized synchronous rectifiers, the biasing of the synchronous switches is supplied directly from the transformer to activate the synchronous switches. Further, in direct drive synchronous rectifiers, a drive signal is supplied from a separate source to the synchronous switches, while timing is provided from drive circuitry.

Converters are subject to abnormal conditions, such as turn-on and turn-off transients, as well as sudden changes in load and input voltage. When a converter uses synchronous-rectification, an additional precaution should be taken during these conditions since such converter can provide bi-directional power flow, and therefore bi-directional current flow through the converter. This means that the output of the converter can unintentionally become a power source and vice versa.

Turn-on transients become major concerns in systems where two or more converters employing synchronous rectification are connected in parallel without or-ing diodes or current unidirectional switches. In such cases, if proper control of synchronous rectifiers is not used, one of the converters could behave as a load, sinking current from the other converter, even at no load condition. Not only is such a system inefficient, but it could inhibit normal start-up during initial turn-on.

Turn-off transients are also important system concerns. If the synchronous rectifier, connected across the output, commonly through an inductor, is not disabled during this transition, a negative voltage at the output can occur due to resonance between an inductor and an output capacitor in a loop with the synchronous rectifier. Since it is a current bi-directional device, the synchronous rectifier allows negative inductor current flow that results in a negative output voltage, which, in most cases will destroy the load. This problem may also occur when two or more converters are connected in parallel.

Additionally, transients within the converter should be unloaded in such a fashion as to not damage the components therein or the load connected to the converter. If the load is suddenly removed from the converter, the energy stored in the inductor is suddenly discharged to the output capacitor. This discharge causes a voltage increase in the output capacitor and, consequently, on the output connectors. The increased voltage (commonly called a voltage overshoot) is proportional to the size of the inductor employed, the current through the inductor and size of the output capacitor.

As this voltage dramatically increases above its steady state value, the feedback loop (including a controller) disables the main switch via a driver and enables the synchronous rectifier so that the energy stored in the inductor continues to circulate through low resistance thus low dissipative synchronous rectifier. Consequently, most of the energy stored into the inductor is discharged into the output capacitor.

One such condition occurs when power stored in an output capacitor is discharged back into the converter, causing a negative current in the inductor. To combat this problem, various converters monitor the current in the inductor and when such current becomes negative, the synchronous rectifier is disabled to alleviate the problem. Unfortunately, such systems allow negative currents in the power converter which may cause damage to various components therein.

Accordingly, what is needed in the art is a system and method that provides improved response in view of transient conditions associated with a power converter.

SUMMARY OF THE INVENTION

To address the above-discussed deficiencies of the prior art, the present invention provides for use in a power converter having a power switch and a synchronous rectifier device coupled between an input and an output thereof, a transient response network, method of disabling a synchronous rectifier device and power converter employing the network and method.

In one embodiment, the transient response network includes a synchronous rectifier controller, coupled to the power switch and the synchronous rectifier device, that senses a state of the power switch and disables the synchronous rectifier device when the power switch has remained in a nonconducting state for at least a specified period of time.

The present invention introduces the broad concept of sensing a state of the power switch of a power converter and disabling the synchronous rectifier device when the power switch remains in a nonconducting state for a period of time. Thus, the transient response network reduces the dissipation of energy at the output the power converter during a transient condition.

For the purposes of the present invention, a transient condition includes any non-steady state condition of the power converter such as start-up, turn-off or temporary removal of the load. Additionally, the functions of the synchronous rectifier controller may be partitioned into discrete devices whereby one circuit senses the state of the power switch and another circuit enables/disables the synchronous rectifier device. Following the shut-down of the synchronous rectifier device, in an alternative embodiment, the transient response network can enable the synchronous rectifier device when the power switch returns to a conducting state and, preferably, only after a specified period of time.

In one embodiment of the present invention, the synchronous rectifier device is located in a discharge path between an inductor and an output capacitor of the power converter. The present invention, however, is equally applicable to a synchronous rectifier device located at any position associated with the power converter.

In one embodiment of the present invention, the power converter further includes a plurality of synchronous rectifier devices. The synchronous rectifier controller is adapted to disable at least one of the plurality of synchronous rectifier devices. In a related, but alternative embodiment, the power converter further includes a plurality of power switches. The synchronous rectifier controller is adapted to disable the synchronous rectifier device when at least one of the plurality of power switches has remained in the nonconducting state for at least the specified period of time. For instance, in a half-bridge converter, the transient response network monitors two power switches and is adapted to disable two synchronous rectifier devices, if necessary. The present invention, however, is equally applicable to any power converter topology (e.g., a flyback converter) employing a synchronous rectifier device.

In one embodiment of the present invention, the specified period of time is greater than one switching cycle of the power switch. The specified period of time is application specific. For instance, in some cases a single switching cycle may be too sensitive and a user may wish to extend the period to disable the synchronous rectifier device for several switching cycles. Conversely, a single switching cycle may be too long a period of time and a user may wish to shorten the period to disable the synchronous rectifier device for a fraction of a switching cycle.

In one embodiment of the present invention, the power switch and the synchronous rectifier device are selected from the group consisting of a field-effect transistor (FET) and a bipolar transistor. Any switching device is well within the broad scope of the present invention.

In one embodiment of the present invention, the synchronous rectifier controller comprises a logic AND gate and a resistor-capacitor circuit. The resistor-capacitor circuit and the AND gate cooperate to allow the synchronous rectifier controller to disable the first synchronous rectifier device when the power switch has remained in the nonconducting state for at least the specified period of time. In a related, but alternative embodiment, the synchronous rectifier controller includes a circuit adapted to enable the synchronous rectifier device when the synchronous rectifier device has been disabled for a selected period of time. In an embodiment to be illustrated and described, the synchronous rectifier controller includes a logic AND gate, a resistor-capacitor circuit and an enabling circuit. Of course, other controllers capable of sensing the state of the power switch in the power converter and disabling the synchronous rectifier device under certain conditions are well within the broad scope of the present invention.

In one embodiment of the present invention, the power converter further comprises a pulse-width modulation (PWM) controller coupled between the power switch and the output. The PWM controller is just one example of a control circuit that may be employed in the power converter of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIGS. 9A–9K illustrate timing diagrams for the power converter of FIG. 8.

DETAILED DESCRIPTION

Figure 1:
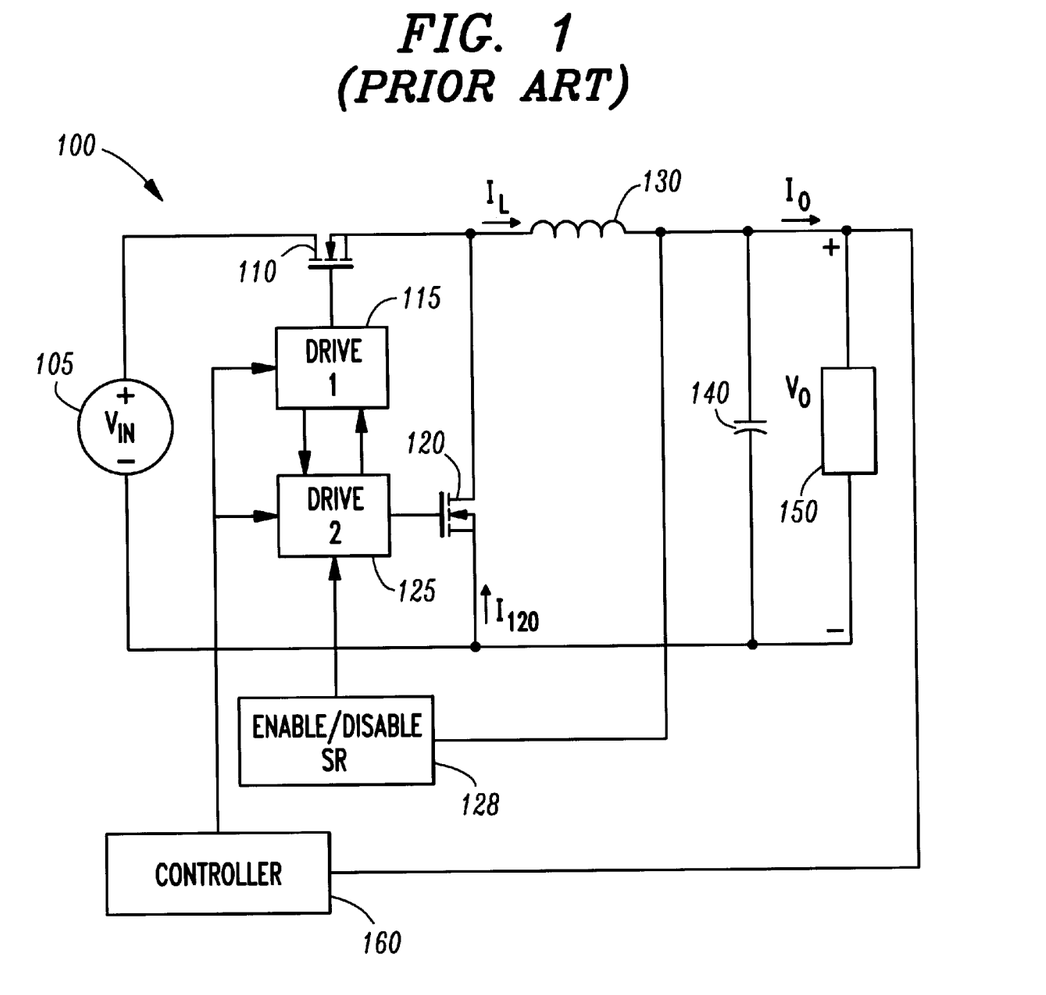
FIG. 1 illustrates a schematic diagram of a power converter employing a prior art synchronous rectifier controller.

Referring initially to FIG. 1, illustrated is a schematic diagram of a power converter employing a prior art synchronous rectifier controller. The power converter 100 receives DC power from a DC source 105. The DC source 105 is coupled to a power switch 110, a synchronous rectifier 120 and first and second driver circuits 115, 125 for driving the power switch 110 and the synchronous rectifier 120, respectively. An output inductor 130 is coupled to the first switch 110 and an output capacitor 140 is coupled to the output of the converter. A converter output voltage $V_O$ is measured across output capacitor 140 and an output current $I_o$ is measured from the output of the converter. A load 150 is coupled across the output capacitor 140 while a conventional feedback controller 160 is coupled to the converter 100 and delivers control signals to the driver circuits 115, 125. Finally, a prior art synchronous rectifier (SR) controller 128 is coupled to the output inductor 130 and to the second driver circuit 125 for disabling the synchronous rectifier 120.

Figure 2:
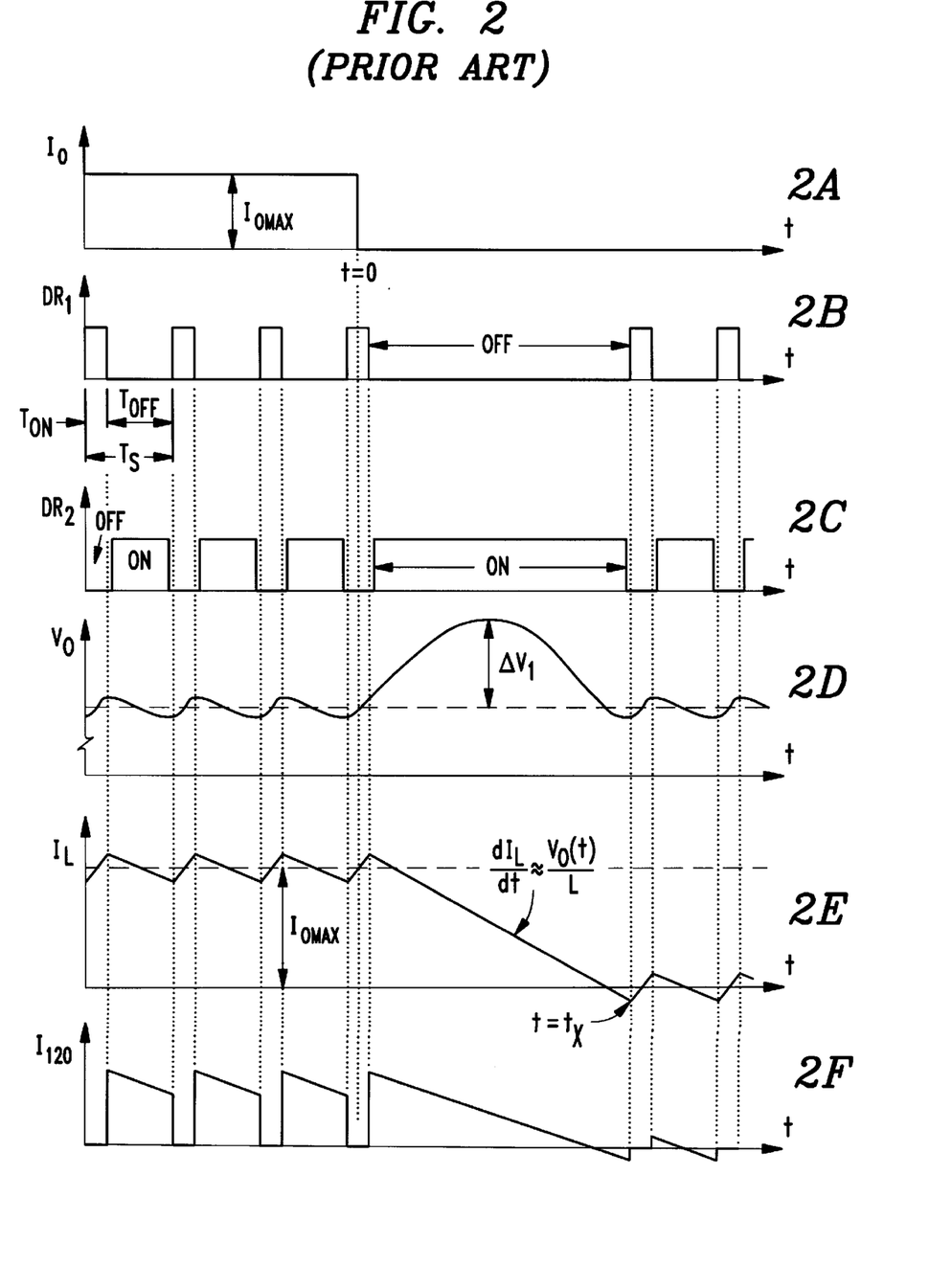
FIGS. 2A–2F illustrate timing diagrams for the power converter of FIG. 1 during an unloading transient.

Turning now to FIGS. 2A–2F, illustrated are exemplary voltage and current waveforms for the power converter of FIG. 1. FIG. 2A represents the converter output current $I_o$ of FIG. 1. FIG. 2B represents the state of the main power switch 110 when it is in either a conducting or nonconducting state. FIG. 2C represents the state of the synchronous rectifier 120 when it is in either a conducting or nonconducting state. FIG. 2D represents the converter output voltage $V_o$ over the time period observed. FIG. 2E represents the output inductor current $I_L$ over the time period observed. Finally, FIG. 2F represents synchronous rectifier current $I_{sr}$.

With continuing reference to FIG. 1, the operation of the converter 100 will hereinafter be described. As can be seen from FIGS. 2B and 2C, the power switch 110 and synchronous rectifier 120 alternate between a conductive state and a non-conductive state. When the power switch 110 conducts, the synchronous rectifier 120 is non-conductive and vice versa. During normal operation, the converter output voltage $V_o$ and the current through the output inductor 130 remain fairly constant, with only minor acceptable variations.

An abnormal condition occurs at t=0, when the load 150 is removed and the output current $I_o$ suddenly drops to zero and the converter output voltage $V_o$ rises above is nominal, steady state value. The power switch 110 is shut down and the synchronous rectifier 120 remains in conductive state. As a result, the converter output voltage $V_o$ rises to an undesirable level $\Delta v_1$. Likewise, during this time, the output inductor current $I_L$ drops at a rate of $dI_L/dt \approx V_o(t)/L$. Likewise, the synchronous rectifier current $I_{sr}$ drops at the same rate. At the time $t=t_x$, both the output inductor current $I_L$ and the synchronous rectifier current $I_{sr}$ both go negative. When the prior art synchronous rectifier controller 128 senses the negative synchronous rectifier current $I_{sr}$, the synchronous rectifier 120 is disabled and the power switch is once again engaged, returning the converter to a normal operating mode. This prior art power converter 100 does not in any way reduce the value of the undesirable voltage level $\Delta v_1$ and, consequently, only helps to prevent negative current flow during start-up and shut-down.

Figure 3:
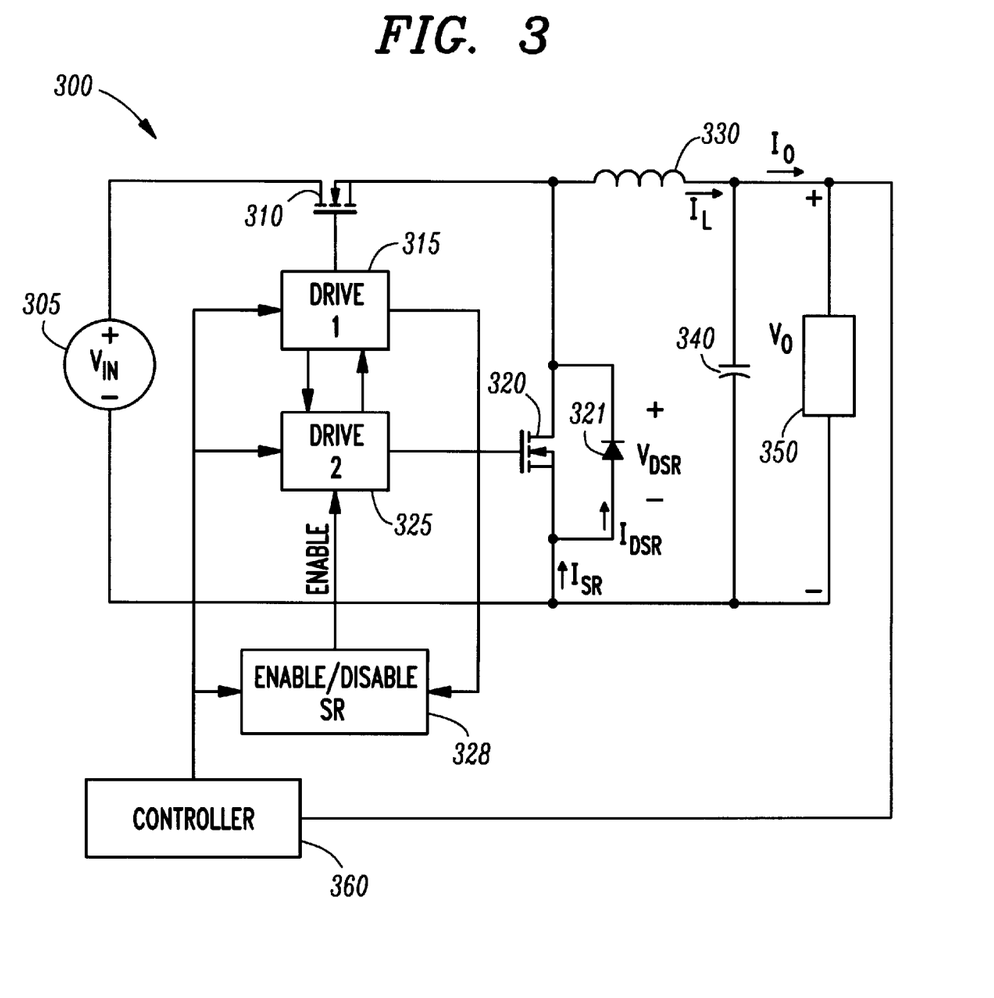
FIG. 3 illustrates a schematic diagram of a switched-mode power converter employing an embodiment of a synchronous rectifier controller constructed according to the principles of the present invention.

Turning now to FIG. 3, illustrated is a schematic diagram of a switched-mode power converter 300 employing an embodiment of a synchronous rectifier constructed according to the principles of the present invention. The power converter 300 receives DC power from a DC source 305. The DC source 305 is coupled to a power switch 310, a synchronous rectifier 320 and first and second driver circuits 315, 325 for driving the power switch 310 and the synchronous rectifier 320, respectively. The synchronous rectifier 320 also includes a body diode 321. An output inductor 330 is coupled to the first switch 310 and an output capacitor 340 is coupled to the output of the converter 300. A converter output voltage $V_o$ is measured across the output capacitor 340. A load 350 is coupled across the output capacitor 340 while a conventional feedback controller (e.g., a pulse-width modulation controller) 360 is coupled to the converter 300 and delivers control signals to the driver circuits 315, 325. Finally, a synchronous rectifier (SR) controller 328 is coupled to the first driver circuit 315 and to the second driver circuit 325 for disabling the synchronous rectifier 320.

Figure 4:
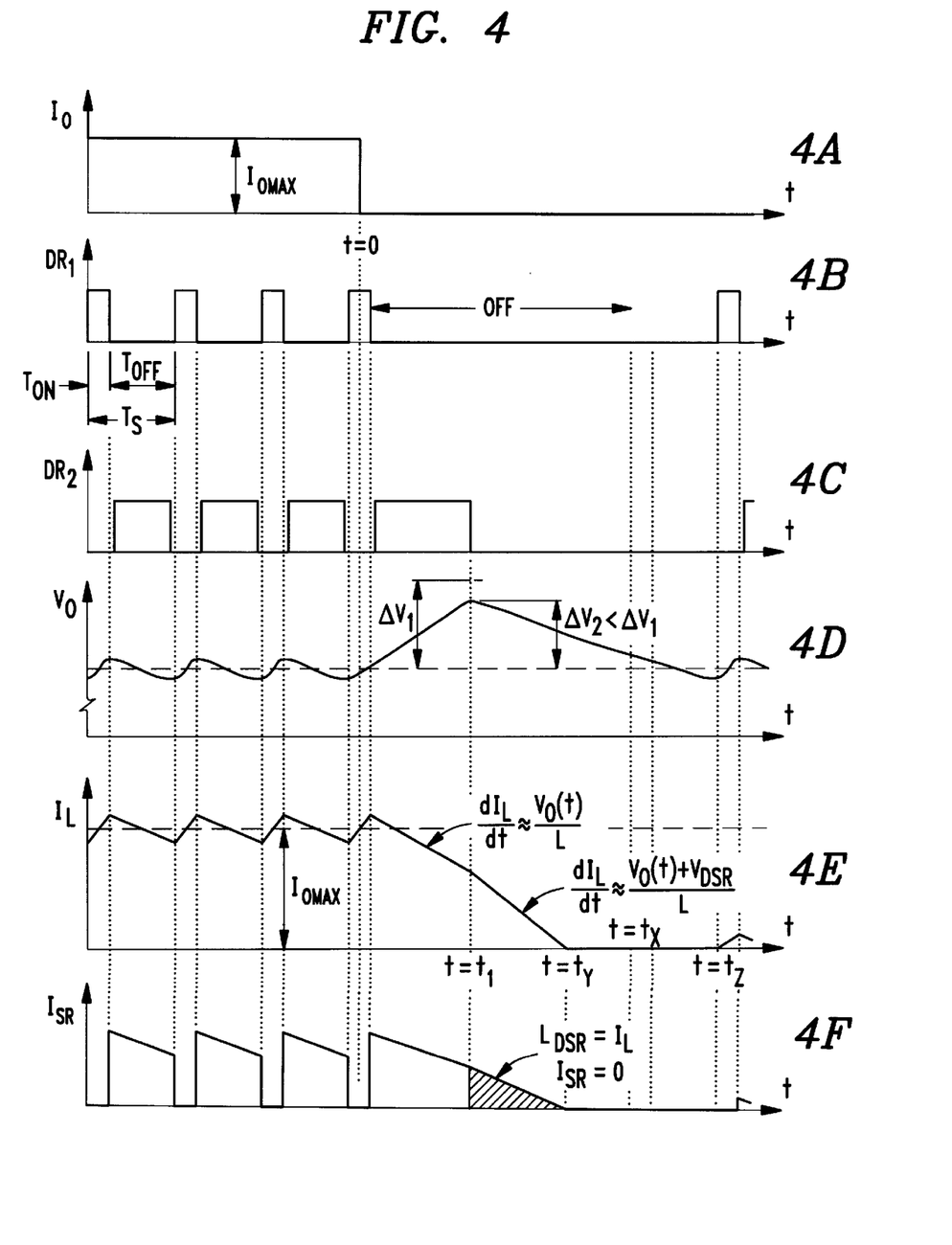
FIGS. 4A–4F illustrate timing diagrams for the power converter of FIG. 3 during an unloading transient.

Turning now to FIGS. 4A–4F, illustrated are exemplary voltage and current waveforms for the power converter of FIG. 3. FIG. 4A represents the converter output current $I_o$ of FIG. 3. FIG. 4B represents the state of the main power switch 310 when it is in either a conducting or nonconducting state. FIG. 4C represents the state of the synchronous rectifier 320 when it is in either a conducting or nonconducting state. FIG. 4D represents the converter output voltage $V_o$ over the time period observed. FIG. 4E represents an output inductor current $I_L$ over the time period observed. Finally, FIG. 4F represents synchronous rectifier current $I_{sr}$.

With continuing reference to FIG. 3, the operation of the converter 300 will hereinafter be described. As can be seen from FIGS. 4B and 4C, the power switch 310 and synchronous rectifier 320 alternate between a conductive state and a non-conductive state. When the power switch 310 conducts, the synchronous rectifier 320 is non-conductive and vice versa. During normal operation, the converter output voltage $V_o$ and the output inductor current $I_L$ remain fairly constant, with only minor acceptable variations.

As with the prior art waveforms of FIGS. 2A–2F, an abnormal condition occurs at t=0, when the output current $I_o$ drops to zero, the output voltage rises above its steady state value and the converter shuts down the power switch 310 and the synchronous rectifier 320 remains in conductive state. As a result, the converter output voltage $V_o$ rises to an undesirable level $\Delta v_2$ at $t=t_1$. The undesirable voltage $\Delta v_2$ that occurs in this embodiment is less than the undesirable voltage $\Delta v_1$ experienced in the prior art. The undesirable voltage $\Delta v_2$ is less because the SR controller 328 senses that the power switch 310 has been in a non-conductive state for a given time period and immediately shuts down the synchronous rectifier 320, thus forcing conduction of the synchronous rectifier's body diode 321 and limiting the converter output voltage $V_o$. Once the synchronous rectifier 320 is shut-down, the converter output voltage $V_o$ drops accordingly.

Likewise, during this time, the output inductor current $I_1$ and the synchronous rectifier current $I_{sr}$ drop at a rate of $dI_1/dt \approx V_o(t)/L$ until the synchronous rectifier is shut-down at $t_1$. At this point, the body diode 321 starts conducting and the output inductor current $I_L$ drops at an increased rate $dI_1/dt \approx [V_o(t)+V_{dsr}]/L$ (where $V_{dsr}$ is the forward voltage drop of the body diode 321). The output inductor current $I_L$ reaches zero at $t=t_y$, with this time $t_y$ being less than the time it took the output inductor current $I_L$ in the prior art to reach zero at $t=t_x$. Also, the output inductor current $I_L$ never goes negative during a transient, a definite improvement over the prior art.

Additionally, the synchronous rectifier current $I_{sr}$ immediately drops to zero when the synchronous rectifier 320 is shut-down. As a result, the current that existed prior to shutdown is dissipated through the body diode 321. The body diode 321 current $I_{dsr}$ equals the output inductor current $I_L$ and decays at the same rate. Due to the increased voltage drop across the body diode 321, more energy previously stored in the inductor 330 is now dissipated in the body diode 312, thus leaving less energy to be discharged into the output capacitor 340. As a result, the voltage overshoot experienced in this circuit is much less than that exhibited in the prior art. Therefore, this converter 300 prevents negative current flow in the converter and consequently prevents the presence of negative voltage at the output at turn-off, and greatly reduces the voltage overshoot during unloading transients.

Figures 5, 6:
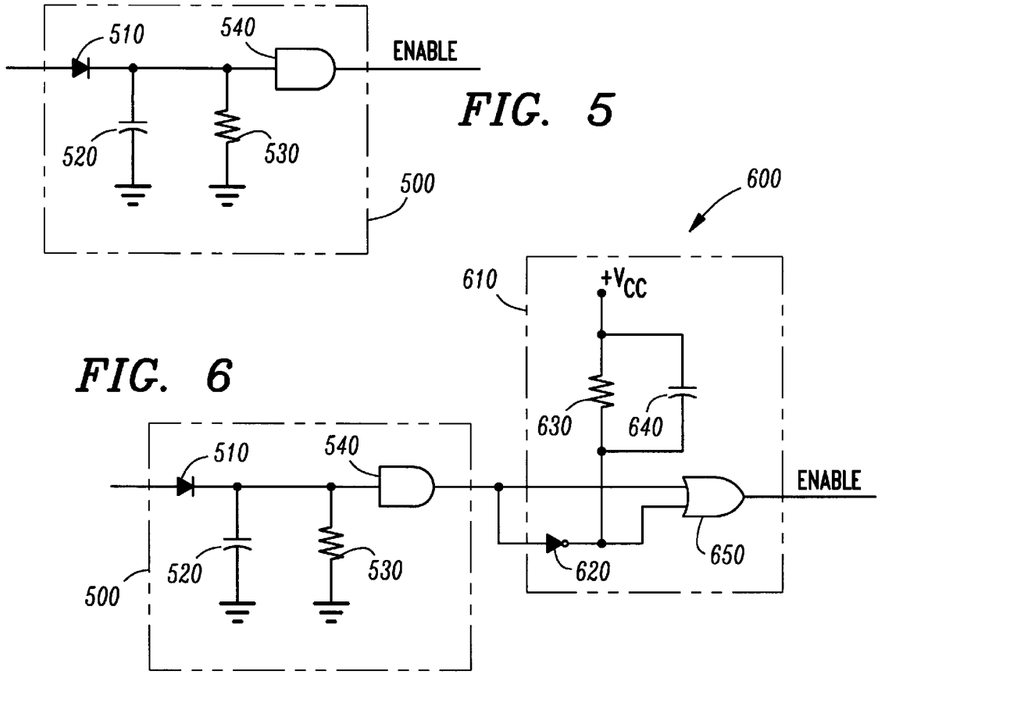
FIG. 5 illustrates an embodiment of a synchronous rectifier controller constructed according to the principles of the present invention.
FIG. 6 illustrates another embodiment of a synchronous rectifier controller constructed according to the principles of the present invention.

Turning now to FIG. 5, illustrated is an embodiment of a synchronous rectifier controller 500 constructed according to the principles of the present invention. The synchronous rectifier (SR) controller 500 includes a diode 510 which receives an input from the controller 360 or from the first driver circuit 315 from FIG. 3. A first capacitor 520 and a first resistor 530 are coupled in parallel between the diode 510 and ground. An AND gate 540 receives an input from the diode 510 and its output is coupled to the second driver circuit 325.

As stated, the SR controller 500 receives an input signal from either the controller 360 or from the first driver circuit 315. The first capacitor 520 is charged whenever the input signal from the controller 360 or first driver circuit 315 is high. If the input signal ceases, the first capacitor 520 is discharged through the first resistor 530. Once the voltage across the capacitor 520 drops below a threshold of the AND gate 540, the output of the AND gate 540 goes low and disables the second driver circuit 325 for the synchronous rectifier 320. The combination of the first capacitor 520 and the first resistor 530 form an RC circuit with a known time constant. This filter, together with the known threshold of the AND gate 540, determine when to disable the synchronous rectifier 320 after the loss of the signal from either the controller 360 or the first driver switch 315. Also, during initial start-up, the synchronous rectifier 320 will be disabled until the first capacitor 520 is charged above the threshold of the AND gate 540.

Turning now to FIG. 6, illustrated is another embodiment of a synchronous rectifier controller 600 constructed according to the principles of the present invention. The synchronous rectifier (SR) controller 600 includes first and second stages 500, 610 that receive an input from the controller 360 or from the first driver circuit 315 from FIG. 3. The first stage 500 is analogous to the embodiment of the synchronous rectifier controller of FIG. 5 and is coupled in series to the second stage 610.

The second stage 610 includes an OR gate that receives a first input from the output of the first stage 500. Further, an inverter 620 is coupled between the output of the first stage 500 and a second input of the OR gate 650. A second capacitor 630 and a second resistor 640 are coupled in parallel between a supplied voltage $V_{cc}$ and the second input of the OR gate. Finally, the output of the OR gate is coupled to the second driver circuit 325.

This embodiment of the SR controller 600 functions much like that in FIG. 5. The first stage 500 is the same as that in FIG. 5 except that the time constant of the first capacitor 520 and first resistor 530 is smaller than that in the previous embodiment and larger than the time constant of the second capacitor 640 and second resistor 630. When the SR controller 600 loses the signal from either the controller 360 or the first driver circuit 325, the output of the AND gate 540 goes low, disabling the second driver circuit 325.

Once the AND gate 540 goes low, the output of the inverter 620 goes high with the time constant of the second capacitor 640 and second resistor 630. Prior to the period that the output of the AND gate goes low, the second capacitor 640 is charged to the supplied voltage $V_{cc}$. The second capacitor 640 discharges and, as soon as the increasing voltage reaches the threshold of the second input of the OR gate 650, the output of the OR gate 650 goes high even though the first input is low and the synchronous rectifier 320 is enabled.

The second stage 610 limits the time during which the synchronous rectifier 320 is disabled during an unloading transient. This limited disable time further improves the transient response of the converter 300 as a whole. Without the second stage 610, the synchronous rectifier could be disabled for a long period of time, commonly forcing the converter 300 into a discontinuous (i.e., non-synchronous) mode of operation at no-load or light load conditions. Consequently, the converter 300 may experience a slower transient response.

Therefore, with the addition of the second stage, the converter 300 operates in a non-synchronous mode for a finite time as determined by the RC time constant of the second capacitor 640 and the second resistor 630. After this preselected time period, the converter 300 resumes synchronous operation.

Figure 7:
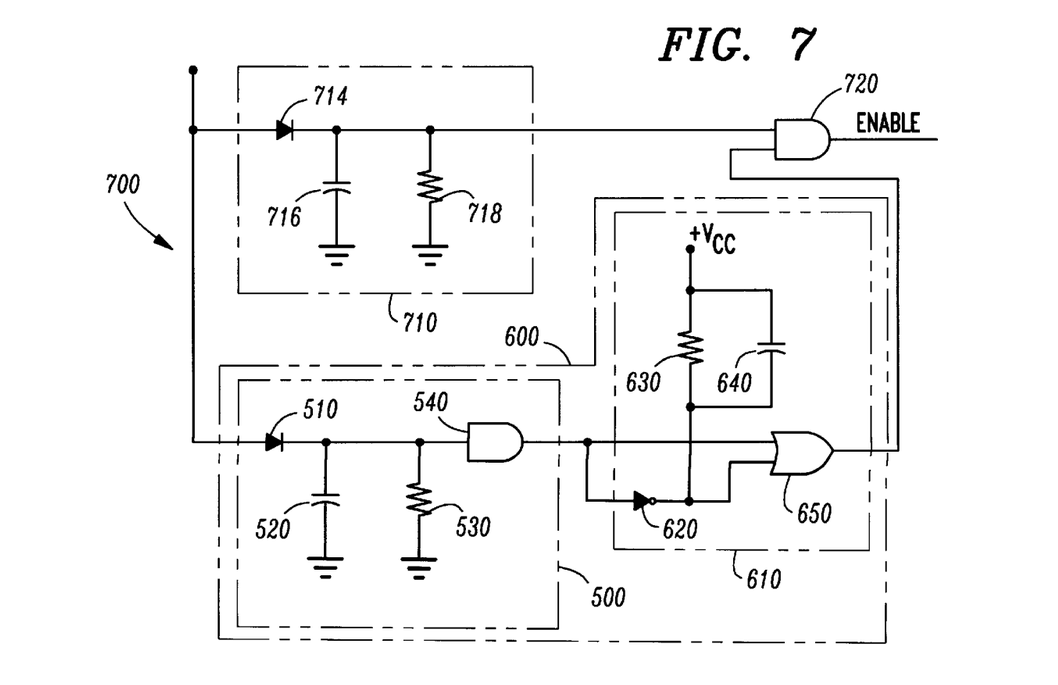
FIG. 7 illustrates yet another embodiment of a synchronous rectifier controller constructed according to the principles of the present invention.

Turning now to FIG. 7, illustrated is yet another embodiment of a synchronous rectifier controller 700 constructed according to the principles of the present invention. The synchronous rectifier (SR) controller 700 includes first, second and third stages 500, 610, 710 that receives an input from the controller 360 or from the first driver circuit 315 from FIG. 3. The first stage consists of the embodiment of the synchronous rectifier controller from FIG. 6, which includes the first and second stage 500, 610, coupled in parallel with the third stage 710 to first and second inputs of a second AND gate 720, respectively. The output of the second AND gate 720 is coupled to the second driver circuit 325.

The third stage 710 includes a second diode 714 that receives an input from the controller 360 or from the first driver circuit 315 from FIG. 3. A third capacitor 716 and a third resistor 718 are coupled in parallel between the second diode 714 and ground. The output of the third stage is coupled to one input of the second AND gate 720.

This embodiment of the SR controller 700 combines the functions of the previous embodiments and adds a longer turn-off cycle. As previously discussed, the first stage 500 functions to disable the synchronous rectifier 320 during an unloading transient. Further, the second stage 610 functions to limit the time during which the synchronous rectifier 320 is disabled during an loading transient. Finally, the third stage 710 is used to turn-off (i.e., disabling) the synchronous rectifier during converter shut-down and functions similarly to the first stage 500. Differences in this stage center around the third capacitor 716 and third resistor 718. These components are chosen to have a large time constant. The selected time constant of the third capacitor 716 and third resistor 718 is much greater than that for the first capacitor 520 and first resistor 530, which in turn is greater than that for the second capacitor 640 and second resistor 630. This allows for an even longer waiting time before the synchronous rectifier 320 is turned off after the power switch 310 is turned off.

Figure 8:
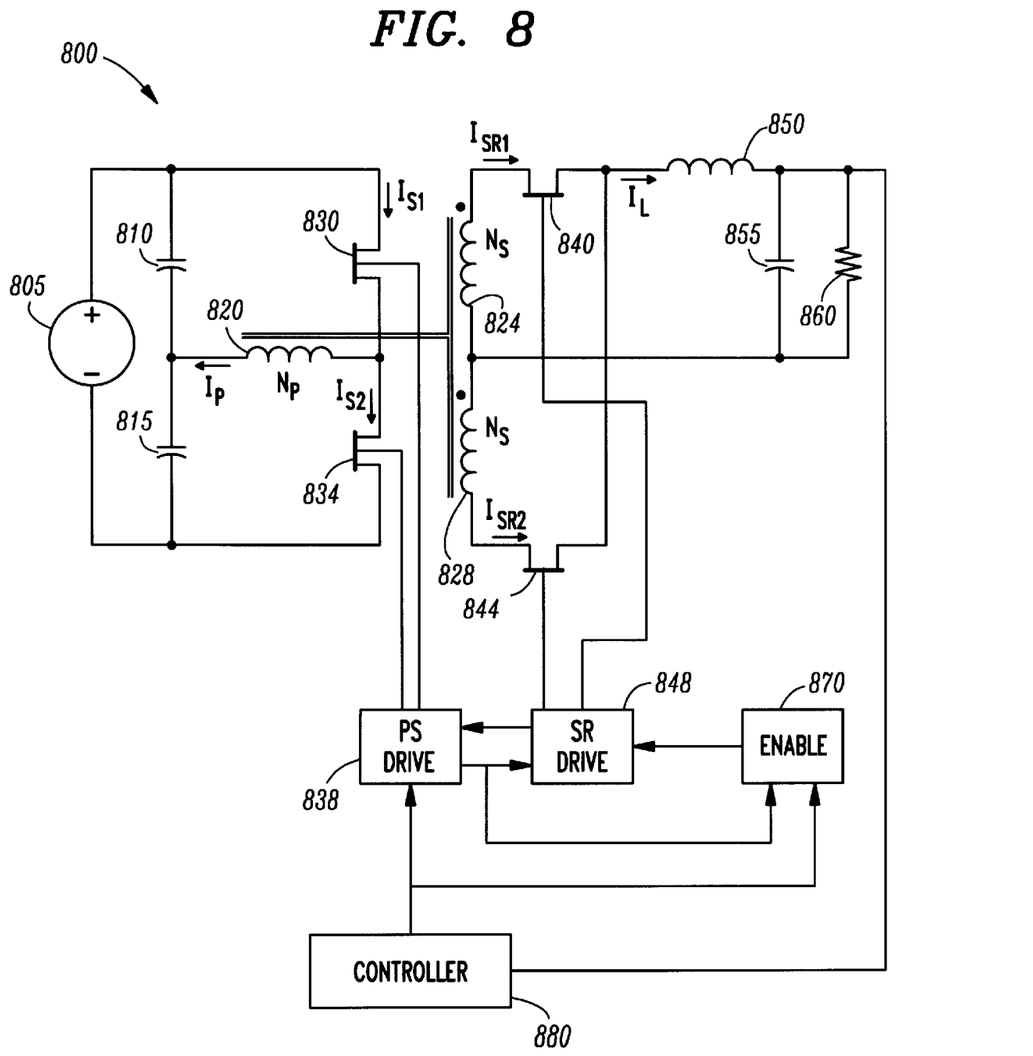
FIG. 8 illustrates a schematic diagram of a power converter employing another embodiment of a synchronous rectifier controller constructed according to the principles of the present invention.

Turning now to FIG. 8, illustrated is a schematic diagram of a power converter 800 employing another embodiment of a synchronous rectifier controller 870 constructed according to the principles of the present invention. The power converter 800 receives DC power from a DC source 805. First and second capacitors 810, 815 are series coupled across the DC source 805. Further, first and second power switches 830, 834 are also coupled together across the DC source 805. An isolation transformer primary winding 820 is coupled between the first and second capacitors 810, 815 and the first and second power switches 830, 834.

First and second secondary windings 824, 828 are coupled together and to first and second synchronous rectifiers 840, 844. An output inductor 850 is coupled to the first and second synchronous rectifiers 840, 844 and to an output capacitor 855. The output capacitor 855 is also coupled to the center tap between the first and second secondary windings 824, 828. Finally, a load 860 is coupled across the output capacitor 855.

The power converter 800 further contains a feedback control loop that includes a conventional controller 880. The controller 880 senses the voltage at the converter output and sends control signals to a power switch (PS) driver 838 and a synchronous rectifier (SR) driver 848 via the synchronous rectifier (SR) controller 870.

The PS driver 838 receives signals from the controller 880 and the SR driver 848 and sends a signal to the SR driver 848 and the SR controller 870 and drive signals to the first and second power switches 830, 834. The SR controller 870, upon receiving proper signals from the controller 880 and the PS driver 838 sends an enabling signal to the SR driver 848 that, in turn, delivers drive signals to the first and second synchronous rectifiers 840, 844.

Figure 9A:
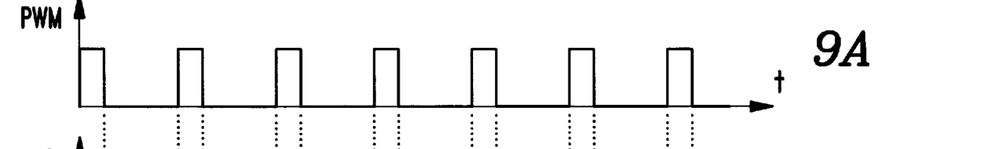
Figure 9B:
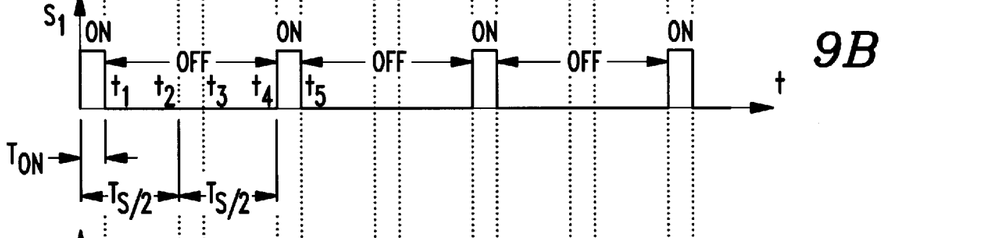
Figure 9C:
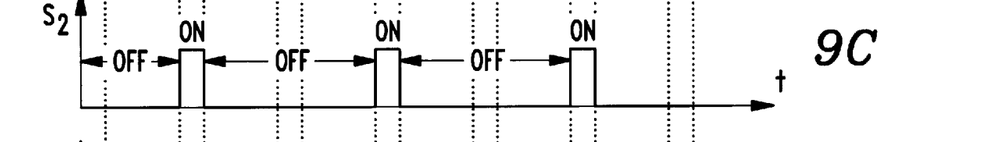

Turning now to FIGS. 9A–9K, illustrated are timing diagrams for the power converter of FIG. 8. FIG. 9A represents the PWM waveform from the conventional controller 880. FIG. 9B represents the drive waveform for the first power switch 830 and FIG. 9C represents the drive waveform for the second power switch 834. As is shown, the first and second power switches 830, 834 do not operate in a conductive state at the same time (e.g., the second power switch 834 is nonconductive when the first power switch is conductive 830).

Figure 9D:
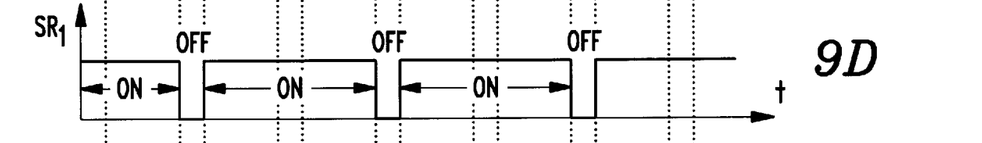
Figure 9E:
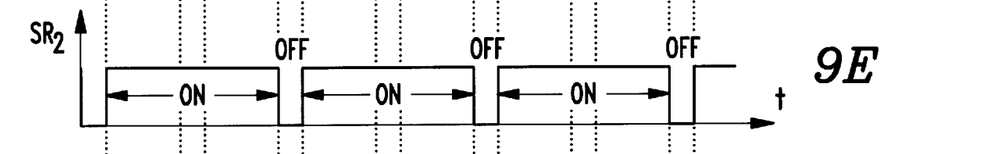

FIGS. 9D and 9E represent the waveforms for the first second synchronous rectifiers 840, 844, respectively. The first and second synchronous rectifiers 840, 844 operate in conjunction with the second and first power switches, respectively. When the first power switch 830 is conducting, the second synchronous rectifier 844 is nonconductive and vice versa. Likewise, when the second power switch 834 is conductive, the first synchronous rectifier 840 is nonconductive and vice versa.

To further illustrate the relationship between the power switches 830, 834 and the synchronous rectifiers 840, 844, the normal operation of this relationship will hereinafter be described. At a time $t_o$, an initial state, the first power switch 830 will conduct and the second power switch 834 will not conduct. In response, the second synchronous rectifier 844 will not conduct while the first synchronous rectifier 840 will conduct. During a first state, $t_0-t_1$, the power switches 830, 834 and the synchronous rectifiers will 840, 844 remain as in the initial state. During a second state, $t_1-t_2$, neither power switches 830, 834 will conduct. In response, both synchronous rectifiers 844, 840 will conduct.

During a third state, $t_2-t_3$, the first power switch 830 will not conduct and the second power switch 834 will conduct. Likewise, the second synchronous rectifier 844 will conduct while the first synchronous rectifier 840 will not conduct. During a fourth state, $t_3-t_4$, both power switches 830, 834 will not conduct. In response, both synchronous rectifiers 844, 840 will conduct. Commonly, a switching cycle $t_s$ is represented as $t_0-t_4$. When $t=t_4$, the switching cycle $t_s$ is complete and the four operating states repeat.

Figure 9F:
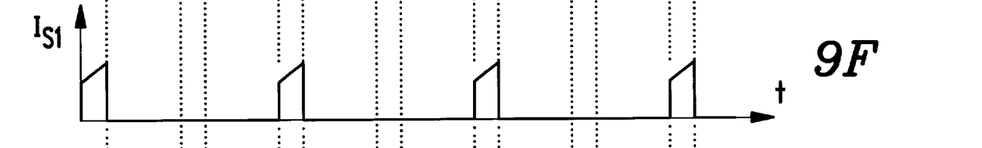
Figure 9G:
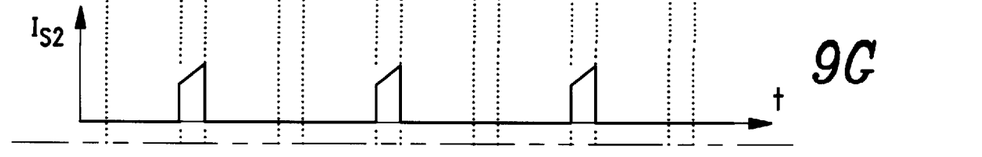

FIGS. 9F–9G represent the currents $I_{s1}$, $I_{s2}$, through the first and second power switches, 830, 834, respectively. FIG. 9H represents the current through the primary winding 820 of the isolation transformer $I_p$. FIG. 9I–9H represent the currents $I_{sr1}$, $I_{sr2}$, through the first and second synchronous rectifiers 840, 844, respectively. Finally, FIG. 9K represents the current $I_L$ through the output inductor 850.

During a transient situation, the SR controller 870 senses the existence of the PWM drive signal as illustrated in FIG. 9A. If the signal is missing for a predetermined time (commonly, at least $t_s/2$), both the first and second synchronous rectifiers 840, 844 will be disabled. Depending on the operational requirements of the circuit, the SR controller 870 may only disable one of the two synchronous rectifiers 840, 844. Another possibility for disabling with synchronous rectifiers 840, 844 include disabling one for half of the switching cycle when its corresponding power switch 830, 834 is supposed to be enabled (i.e., 830–844 & 834–840).

While specific embodiments of the synchronous rectifier controller have been illustrated and described, other embodiments are well within the broad scope of the present invention. Additionally, any converter topology is well within the broad scope of the present invention. For a better understanding of converters, synchronous rectifiers and control thereof, see *Power Supply Cookbook* by Marty Brown, Butterworth-Heinemann (1994), which is incorporated herein by reference.

Although the present invention has been described in detail, those skilled in the art should understand that they can make various changes, substitutions and alterations herein without departing from the spirit and scope of the invention in its broadest form.

What is claimed is:

1. For use in a power converter having a power switch and a synchronous rectifier device coupled between an input and an output thereof, a transient response network, comprising:
    a synchronous rectifier controller, coupled to said power switch and said synchronous rectifier device, that senses a drive signal to said power switch and disables said synchronous rectifier device when said drive signal is missing for at least a specified period of time.

2. The network as recited in claim 1 wherein said synchronous rectifier device is located in a discharge path between an inductor and an output capacitor of said power converter.

3. The network as recited in claim 1 wherein said power converter further comprises a plurality of synchronous rectifier devices, said synchronous rectifier controller adapted to disable at least one of said plurality of synchronous rectifier devices.

4. The network as recited in claim 1 wherein said power converter further comprises a plurality of power switches, said synchronous rectifier controller adapted to disable said synchronous rectifier device when at least one of said plurality of power switches has remained in said nonconducting state for at least said specified period of time.

5. The network as recited in claim 1 wherein said specified period of time is greater than one switching cycle of said power switch.

6. The network as recited in claim 1 wherein said synchronous rectifier controller comprises a logic AND gate and a resistor-capacitor circuit, said resistor-capacitor circuit and said logic AND gate cooperating to allow said synchronous rectifier controller to disable said synchronous rectifier device when said power switch has remained in said non-conducting state for at least said specified period of time.

7. The network as recited in claim 1 wherein said synchronous rectifier controller comprises a circuit adapted to enable said synchronous rectifier device when said synchronous rectifier device has been disabled for a selected period of time.

8. The network as recited in claim 1 wherein said power switch and said synchronous rectifier device are selected from the group consisting of:
    a field-effect transistor (FET), and
    a bipolar transistor.

9. The network as recited in claim 1 wherein said power converter further comprises a pulse-width modulation controller coupled between said power switch and said output.

10. For use in a power converter having a power switch and a synchronous rectifier device coupled between an input and an output thereof, a method of disabling said synchronous rectifier device, comprising:
    sensing a drive signal to said power switch; and
    disabling said synchronous rectifier device when said drive signal is missing for at least a specified period of time.

11. The method as recited in claim 10 further comprising positioning said synchronous rectifier device in a discharge path between an inductor and an output capacitor of said power converter.

12. The method as recited in claim 10 wherein said power converter further comprises a plurality of synchronous rectifier devices, the method further comprising disabling at least one of said plurality of synchronous rectifier devices.

13. The method as recited in claim 10 wherein said power converter further comprises a plurality of power switches, the method further comprising disabling said synchronous rectifier device when at least one of said plurality of power switches has remained in said nonconducting state for at least said specified period of time.

14. The method as recited in claim 10 wherein said specified period of time is greater than one switching cycle of said power switch.

15. The method as recited in claim 10 wherein the act of disabling is performed by a synchronous rectifier controller comprising a logic AND gate and a resistor-capacitor circuit.

16. The method as recited in claim 10 further comprising enabling said synchronous rectifier device in a selected period of time following the act of disabling.

17. The method as recited in claim 10 wherein said power switch and said synchronous rectifier device are selected from the group consisting of:
   a field-effect transistor (FET), and
   a bipolar transistor.

18. The method as recited in claim 10 further comprising controlling said power switch with a pulse-width modulation controller.

19. A power converter, comprising:
   a power switch coupled to an input of said power converter;
   an inductor coupled to said power switch;
   an output capacitor coupled to an output of said power converter;
   a synchronous rectifier device located in a discharge path between said inductor and said output capacitor; and
   a transient response network, comprising:
      a synchronous rectifier controller, coupled to said power switch and said synchronous rectifier device, that senses a drive signal to said power switch and disables said synchronous rectifier device when said drive signal is missing for at least a specified period of time.

20. The power converter as recited in claim 19 further comprising a plurality of synchronous rectifier devices, said synchronous rectifier controller adapted to disable at least one of said plurality of synchronous rectifier devices.

21. The power converter as recited in claim 19 further comprising a plurality of power switches, said synchronous rectifier controller adapted to disable said synchronous rectifier device when at least one of said plurality of power switches has remained in said nonconducting state for at least said specified period of time.

22. The power converter as recited in claim 19 wherein said specified period of time is greater than one switching cycle of said power switch.

23. The power converter as recited in claim 19 wherein said synchronous rectifier controller comprises a logic AND gate and a resistor-capacitor circuit, said resistor-capacitor circuit and said logic AND gate cooperating to allow said synchronous rectifier controller to disable said synchronous rectifier device when said power switch has remained in said nonconducting state for at least said specified period of time.

24. The power converter as recited in claim 19 wherein said synchronous rectifier controller comprises a circuit adapted to enable said synchronous rectifier device when said synchronous rectifier device has been disabled for a selected period of time.

25. The power converter as recited in claim 19 wherein said power switch and said synchronous rectifier device are selected from the group consisting of:
   a field-effect transistor (FET), and
   a bipolar transistor.

26. The power converter as recited in claim 19 further comprising a pulse-width modulation controller coupled between said power switch and said output.

* * * * *

UNITED STATES PATENT AND TRADEMARK OFFICE
CERTIFICATE OF CORRECTION

PATENT NO. : 5,940,287
DATED : August 17, 1999
INVENTOR(S) : Milivoje Slobodan Brkovic

It is certified that error appears in the above-identified patent and that said Letters Patent is hereby corrected as shown below:

Column 9, line 32, "9I-9H" should be --9I-9J--.

Signed and Sealed this

Tenth Day of April, 2001

Attest:

NICHOLAS P. GODICI

Attesting Officer    Acting Director of the United States Patent and Trademark Office